United States Patent
Jia et al.

(10) Patent No.: US 10,339,402 B2
(45) Date of Patent: Jul. 2, 2019

(54) METHOD AND APPARATUS FOR LIVENESS DETECTION

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Kai Jia, Beijing (CN); Qi Yin, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

(*) Notice: Subject to any disclaimer, the term of this patent is extended or adjusted under 35 U.S.C. 154(b) by 103 days.

(21) Appl. No.: 15/239,466

(22) Filed: Aug. 17, 2016

(65) Prior Publication Data
US 2017/0169304 A1 Jun. 15, 2017

(30) Foreign Application Priority Data
Dec. 9, 2015 (CN) .......................... 2015 1 0900717

(51) Int. Cl.
*G06K 9/00* (2006.01)
*H04L 29/06* (2006.01)
*H04W 12/06* (2009.01)

(52) U.S. Cl.
CPC ..... *G06K 9/00906* (2013.01); *G06K 9/00255* (2013.01); *H04L 63/0861* (2013.01); *H04W 12/06* (2013.01)

(58) Field of Classification Search
None
See application file for complete search history.

(56) References Cited

U.S. PATENT DOCUMENTS

| 8,090,163 B2 * | 1/2012 | Schuckers ........ G06K 9/00114 382/125 |
| 8,856,541 B1 * | 10/2014 | Chaudhury ............ G06F 21/32 382/115 |

(Continued)

FOREIGN PATENT DOCUMENTS

| CN | 102622588 | 8/2012 |
| CN | 102799856 | 11/2012 |

(Continued)

OTHER PUBLICATIONS

Multi-Modal Face and Speaker Identification on a Handheld Device, Timothy Hazen et al.In Proc. of Workshop on Multimodal User Authentication, Dec. 11-12, 2003, pp. 113-120 (Year: 2003).*

(Continued)

*Primary Examiner* — Jayesh A Patel
(74) *Attorney, Agent, or Firm* — Hamre, Schumann, Mueller & Larson, P.C.

(57) ABSTRACT

There are provided a liveness detection method and device. The liveness detection method comprises: generating a random action instruction sequence including at least one random action instruction; sequentially sending a random action instruction in the random action instruction sequence; and determining whether the sequentially sent random action instruction in the random action instruction sequence is sequentially executed by a living body based on detection information of at least two sensors, wherein the at least two sensors comprise an image sensor and at least one non-image sensor; and determining that the liveness detection is succeeded if the sequentially sent random action instruction in the random action instruction sequence is sequentially executed by the living body. Accuracy of liveness detection can be improved by adopting the random action sequence (Continued)

and by combining images captured by the image sensor and information detected by the non-image sensor.

15 Claims, 7 Drawing Sheets

(56) References Cited

U.S. PATENT DOCUMENTS

| | | | | |
|---|---|---|---|---|
| 2013/0044920 | A1* | 2/2013 | Langley | G06F 21/32 382/115 |
| 2014/0037156 | A1* | 2/2014 | Cavallini | G06K 9/629 382/118 |
| 2014/0099003 | A1* | 4/2014 | Langley | G06K 9/00255 382/115 |
| 2014/0337930 | A1* | 11/2014 | Hoyos | H04L 63/10 726/4 |
| 2014/0337948 | A1* | 11/2014 | Hoyos | H04L 63/0861 726/7 |
| 2015/0154392 | A1* | 6/2015 | Bao | G06F 21/32 726/19 |
| 2015/0169943 | A1* | 6/2015 | Khitrov | G06K 9/00288 382/116 |

FOREIGN PATENT DOCUMENTS

| | | |
|---|---|---|
| CN | 102945362 | 2/2013 |
| CN | 103440479 | 12/2013 |
| CN | 104683302 | 6/2015 |
| CN | 104751110 | 7/2015 |
| CN | 104834900 | 8/2015 |

OTHER PUBLICATIONS

First Chinese Office Action, issued in the corresponding Chinese patent application No. 201510900717.6, dated May 2, 2018, 15 pages.

Second Chinese Office Action, issued in the corresponding Chinese patent application No. 201510900717.6, dated Nov. 16, 2018, 8 pages.

* cited by examiner

METHOD AND APPARATUS FOR LIVENESS DETECTION

CROSS-REFERENCE TO RELATED APPLICATIONS

The present application claims the priority of a Chinese patent application No. 201510900717.6 filed on Dec. 9, 2015, the disclosure of which is incorporated herein by reference in its entirety.

TECHNICAL FIELD

The present disclosure relates to a technical field of human face recognition, in particular to method and apparatus for liveness detection.

BACKGROUND

At present, a human face recognition system is increasingly applied to scenarios of security and finance fields that need identity authentication, such as remote bank account opening system, access control system, and remote trading operation verification system and so on. In these application fields with high security levels, besides ensuring that human face similarity of a person to be verified matches with a base library stored in a database, it firstly needs to verify that the person to be verified is a legitimate biological living body. That is, the face recognition system needs to be capable of preventing an attacker from attacking by means of using a picture, a video, a 3D human face model or a face mask and so on.

The method for solving the above problems is usually called liveness detection. At present, there has not been any well-known mature liveness verification scheme in the technical products on the market yet. The existing technique either depends on a special hardware device (such as an infrared camera, a depth camera) or only prevents attacks by means of simple still pictures.

Therefore, there is a need for a human face recognition mode that is capable of effectively preventing attacks of various manners, such as attacks using a picture, a video, a 3D human face model or a face mask and so on, instead of depending on a special hardware device.

SUMMARY

Given the above problems, the present disclosure is proposed. The present disclosure provides a liveness detection method and apparatus. Accuracy of liveness detection can be improved by using a random action sequence and by combining an image captured by an image sensor and information detected by a non-image sensor.

According to one aspect of the present disclosure, there is provided a liveness detection method, comprising: generating a random action instruction sequence including at least one random action instruction; sequentially sending a random action instruction in the random action instruction sequence; and determining whether the sequentially sent random action instruction in the random action instruction sequence is sequentially executed by a living body based on detection information of at least two sensors, wherein the at least two sensors comprise an image sensor and at least one non-image sensor; and determining that the liveness detection is succeeded if the sequentially sent random action instruction in the random action instruction sequence is sequentially executed by the living body.

According to an embodiment of the present disclosure, if a currently sent random action instruction is determined to be not executed by the living body, it is determined that the liveness detection is failed; and in the case that the currently sent random action instruction is not the last random action instruction in the random action instruction sequence, a next random action instruction is sent when the currently sent random action instruction is determined to be executed by the living body.

According to an embodiment of the present disclosure, the random action instruction sequence comprises at least two categories of action instructions selected from a group comprising a first category of action instructions, a second category of action instructions and a third category of action instructions, or the random action instruction sequence comprises only the third category of action instructions, and the method further comprises: for each first category of action instructions, determining whether a currently sent action instruction of the first category is executed by the living body according to an image captured by the image sensor; for each second category of action instructions, determining whether a currently sent action instruction of the second category is executed by the living body according to the information detected by the at least one non-image sensor; and for each third category of action instructions, determining whether a currently sent action instruction of the third category is executed by the living body according to the image captured by the image sensor and the information detected by the non-image sensor.

According to an embodiment of the present disclosure, the at least one non-image sensor comprises at least one of a light sensor, a distance sensor, an acceleration sensor and a gyroscope.

According to an embodiment of the present disclosure, first detection information obtained from the image captured by the image sensor includes at least one of facial gesture, facial key points, image texture information, image luminance, and object recognized in the image captured by the image sensor, and second detection information obtained from the information detected by the at least one non-image sensor includes at least one of light intensity, distance information, acceleration information, and gyroscope information.

According to an embodiment of the present disclosure, the method further comprises: for each third category of action instructions, determining a first decision parameter based on the first detection information, determining a second decision parameter based on the second detection information, and determining that the liveness detection is failed if the first decision parameter does not match with the second decision parameter.

According to an embodiment of the present disclosure, the first decision parameter includes at least one of size and/or size variation of the object in the captured image, distance and/or distance variation among objects in the captured image, image luminance variation in the captured image, image luminance variation in a located facial region, the facial gesture, distance and/or distance variation among facial key points in the captured image, and image texture information in the captured image; and the second decision parameter comprises at least one of light intensity and/or light intensity variation, a distance and/or distance variation of the object in the captured image relative to the distance sensor, a spatial position and/or spatial position variation of the object in the captured image relative to the acceleration sensor and/or the gyroscope.

According to another aspect of the present disclosure, there is provided a liveness detection apparatus, comprising: an instruction sequence generating module configured to generate a random action instruction sequence including at least one random action instruction; an instruction sending module configured to sequentially send a random action instruction in the random action instruction sequence; a first processing module configured to process an image captured by an image sensor to generate first detection information; a second processing module configured to process information detected by at least one non-image sensor to generate second detection information; and a heterogeneous information decision module configured to determine whether the sequentially sent random action instruction is sequentially executed by a living body based on the first detection information and the second detection information, and configured to determine that the liveness detection is succeeded if the sequentially sent random action instruction in the random action instruction sequence sent by the instruction sending module is sequentially executed by the living body.

According to an embodiment of the present disclosure, the heterogeneous information decision module determines that the liveness detection is failed if a random action instruction currently sent by the instruction sending module is determined to be not executed by the living body; and in the case that the currently sent random action instruction is not the last action instruction in the random action instruction sequence, the instruction sending module sends a next random action instruction when the heterogeneous information decision module determines that the random action instruction currently sent by the instruction sending module is executed by the living body.

According to an embodiment of the present disclosure, the random action instruction sequence comprises at least two categories of action instructions selected from a group comprising a first category of action instructions, a second category of action instructions and a third category of action instructions, or the random action instruction comprises only the third category of action instructions. For each action instruction of the first category, the heterogeneous information decision module determines whether the action instruction of the first category currently sent by the instruction sending module is executed by the living body according to the first detection information generated by the first processing module; for each action instruction of the second category, the heterogeneous information decision module determines whether the action instruction of the second category currently sent by the instruction sending module is executed by the living body according to the second detection information generated by the second processing module; for each action instruction of the third category, the heterogeneous information decision module determines whether the action instruction of the third category currently sent by the instruction sending module is executed by the living body according to both the first detection information generated by the first processing module and the second detection information generated by the second processing module.

According to an embodiment of the present disclosure, the first processing module comprises at least one of an object recognition sub-module, a face detection and tracking sub-module, a key point locating sub-module, a texture extracting sub-module and a gesture recognizing sub-module; and the first detection information comprises at least one of facial gesture, facial key points, image texture information, the image luminance, and an object recognized in the image captured by the image sensor.

According to an embodiment of the present disclosure, the at least one non-image sensor comprises at least one of a light sensor, a distance sensor, an acceleration sensor and a gyroscope; and the second detection information comprises at least one of light intensity, distance information, acceleration information, and gyroscope information.

According to an embodiment of the present disclosure, for each action instruction of the third category, the heterogeneous information decision module determines a first decision parameter based on the first detection information, determines a second decision parameter based on the second detection information, and determines that the liveness detection is failed if the first decision parameter does not match with the second decision parameter.

According to another aspect of the present disclosure, there is provided a liveness detection apparatus, comprising: an image sensor configured to capture an image; at least one non-image sensor configured to detect information; a storage means configured to store program codes, and a processor; wherein the processor executes the program codes stored in the storage means to perform the steps of: generating an random action instruction sequence including at least one random action instruction; sequentially sending the random action instruction in the random action instruction sequence; determining whether the sequentially sent random action instruction in the random action instruction sequence is sequentially executed by a living body based on detection information of at least two sensors, wherein the at least two sensors comprise the image sensor and the at least one non-image sensor; and determining that the liveness detection is succeeded if the sequentially sent random action instruction in the random action instruction sequence is sequentially executed by the living body.

According to another aspect of the present disclosure, there is provided a storage medium on which program instructions are stored. When being executed by a computer or a processor, the program instructions causes the computer or the processor to perform the liveness detection method according to the embodiments of the present disclosure, and implement the liveness detection apparatus according to the embodiments of the present disclosure.

By adopting the random action sequence and by combining the image captured by the image sensor and the information detected by the non-image sensor, the liveness detection method according to the embodiments of the present disclosure not only can prevent attacks by means of the picture, 3D model and human face mask efficiently, but also is capable of preventing attacks by means of a video recorded in advance more efficiently.

BRIEF DESCRIPTION OF THE DRAWINGS

By describing embodiments of the present disclosure in detail in combination with the accompanying drawings, the above and other purposes, features and advantages of the present disclosure would become more evident. The accompanying drawings are used to provide further explanation of the embodiments of the present disclosure, are composed of a part of the specification, are used to explain the present disclosure together with the embodiments of the present disclosure, and do not form a limitation to the present disclosure. In the figures, same reference signs always represent same means or steps.

DETAILED DESCRIPTION

In order to make purposes, technical solutions and advantages of the present disclosure more evident, exemplary embodiments according to the present disclosure will be described in detail by referring to the accompanying drawings. Obviously, the embodiments described below are just a part of embodiments of the present disclosure rather than all of the embodiments of the present disclosure. It shall be understood that the present disclosure is not limited to the exemplary embodiments described herein. Based on the embodiments of the present disclosure, all of other embodiments obtained by those skilled in the art without paying any inventive labor shall fall into the protection scope of the present disclosure.

Figure 1:
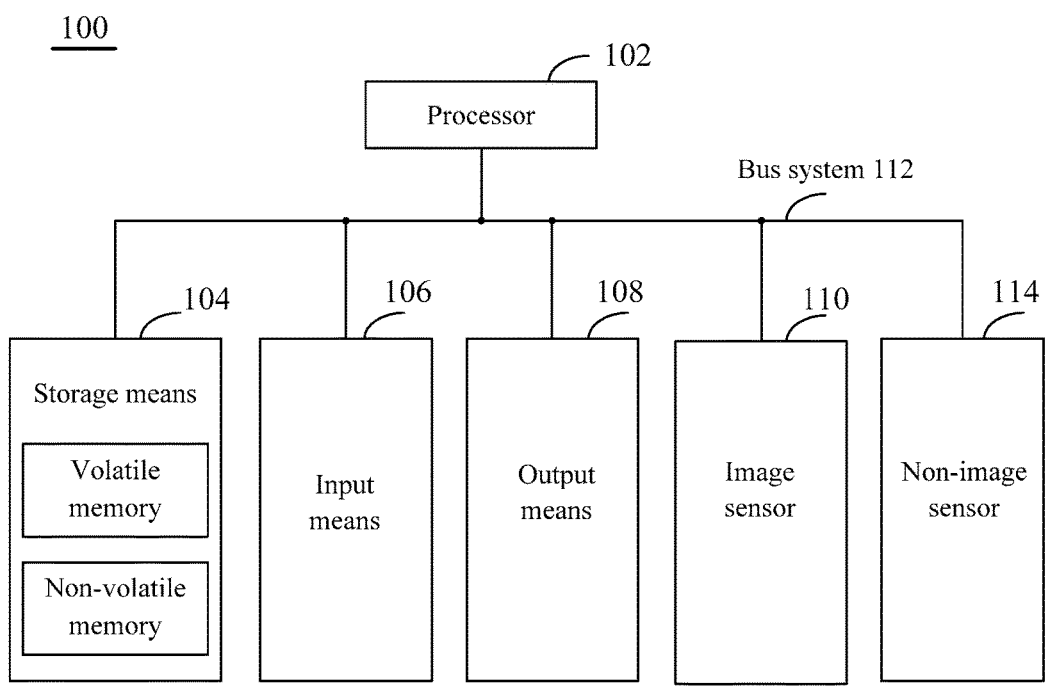
FIG. 1 is a schematic block diagram of an exemplary electronic device configured to implement a liveness detection method and apparatus according to an embodiment of the present disclosure.

First, an exemplary electronic apparatus 100 used to implement a liveness detection method and apparatus according to an embodiment of the present disclosure is described by referring to FIG. 1.

As shown in FIG. 1, the electronic device 100 comprises one or more processors 102, one or more storage means 104, an input means 106, an output means 108, an image sensor 110, and one or more non-image sensors 114. These components are mutually connected to each other via a bus system 112 and/or a connecting mechanism in other forms. It shall be noted that the components and structure of the apparatus 100 as shown in FIG. 1 are just for illustration, instead of limitation. According to the application requirements, the apparatus 100 can also have other components and structures.

The processor 102 may be a central processing unit (CPU) or a processing unit having data processing capability and/or instruction executing capability in other forms, and can control other components in the electronic device 100 to perform desired functions.

The storage means 104 can comprise one or more computer program products. The computer program product can comprise various forms of computer readable storage medium, for example, a volatile memory and/or a non-volatile memory. The volatile memory can comprise, for example, a random access memory (RAM) and/or a cache memory (cache), or the like. The non-volatile memory can comprise, for example, a read only memory (ROM), a hard disk and a flash memory, or the like. One or more computer program instructions can be stored on the computer readable storage medium. The processor 102 can execute the program instructions, so as to realize client functions (realized by the processor) in the embodiments of the disclosure described below and/or other desired functions. Various application programs and various data can further be stored in the computer readable storage medium, for example, various data used and/or produced by the application programs.

The input means 106 can be a means used by a user to input an instruction, and can comprise at least one input means of a keyboard, a microphone and a touch screen, or the like.

The output means 108 can output various information (for example, image or sound) to the outside (for example, the user), and can comprise at least one output means of a display and a loudspeaker or the like.

The image sensor 110 can capture an image (for example, a picture, a video, or the like) desired by the user, and store a captured image in the storage means 104 for use by other components.

Preferably, the exemplary electronic apparatus used to implement the liveness detection method and apparatus according to the embodiment of the present disclosure can be implemented as a smart phone, a tablet computer, and an image acquisition terminal of an access control system, or the like.

Figure 2:
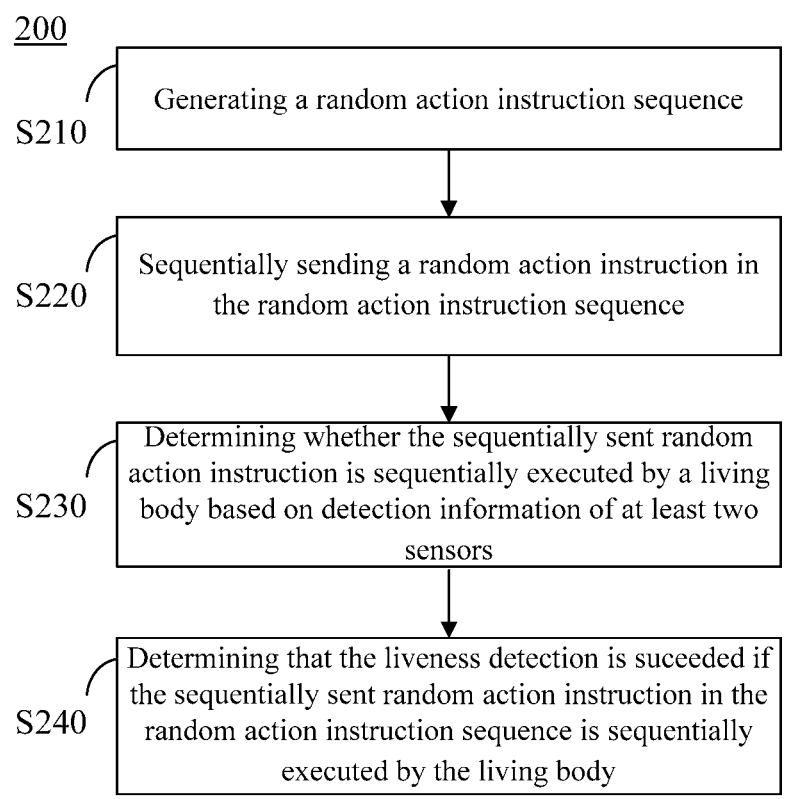
FIG. 2 is a schematic flowchart of a liveness detection method according to an embodiment of the present disclosure.

A liveness detection method 200 according to an embodiment of the present disclosure will be described below by referring to FIG. 2.

First, in step S210, a random action instruction sequence is generated by an instruction sequence generating module, and the random action instruction sequence includes at least one random action instruction.

In one embodiment, the random action instruction sequence is generated randomly by the instruction sequence generating module, such that it is hard to predict content and sequence of specific action instructions in the action instruction sequence in advance. Thus, it is hard to initiate an attack according to action instructions in advance, for example, initiate an attack by recording a human face video in advance.

In step S220, the random action instruction in the random action instruction is sequentially sent by an instruction sending module.

In step S230, a heterogeneous information decision module determines whether the sequentially sent random action instruction in the random action instruction sequence is sequentially executed by a living body based on detection information of at least two sensors, wherein the at least two sensors comprise an image sensor and at least one non-image sensor.

In step S240, the heterogeneous information decision module determines that the living body is detected if the sequentially sent random action instruction in the random action instruction sequence is sequentially executed by the living body.

It shall be known that steps S220 and S230 are performed continuously and repeatedly. In particular, a random action instruction in the random action instruction sequence that has a highest order currently is sent in step S220, and it is determined in step S230 whether the currently sent random action instruction is executed by the living body.

In particular, on one hand, if the currently sent radon action instruction in step S220 is not the last random action instruction in the random action instruction sequence, when the heterogeneous information decision module determines in step S230 that the currently sent random action instruction is executed by the living body, the method 200 returns to step S220 to send a next random action instruction in the random action instruction sequence. On the other hand, if the currently sent random action instruction in step S220 is the last random action instruction in the random action instruction, when the heterogeneous information decision module determines in step S230 that the currently sent random action instruction is executed by the living body, the heterogeneous information decision module determines in step S240 that the liveness detection is successful.

No matter whether the currently sent random action instruction in step S220 is the last random action instruction in the random action instruction or not, if the currently sent random action instruction is determined to be not executed by the living body in Step 230, the heterogeneous information decision module determines directly that the liveness detection is failed.

The liveness detection method and/or apparatus according to the embodiment of the present disclosure can be disposed at a human face image acquisition terminal. For example, in a security application field, the liveness detection method and/or apparatus can be disposed at an image acquisition terminal of an access control system, in a financial application field, the liveness detection method and/or apparatus can be disposed at a personal terminal, such as a smart phone, a tablet terminal, and a personal computer or the like.

Alternatively, the liveness detection method according to the embodiment of the present disclosure can be disposed at a server terminal (or in cloud) and at a personal terminal. For example, in a financial application field, a random action instruction sequence can be generated at the server terminal (or in the cloud), the server terminal (or the cloud) sends the generated random action instruction sequence to the personal terminal, and the personal terminal performs the liveness detection according to a received random action instruction sequence. For another example, the random action instruction sequence can be generated at the server terminal (or in the cloud), the personal terminal sends images captured by an image sensor or information detected by at least one non-image sensor to the server terminal (or the cloud), and then the server terminal (or the cloud) performs liveness detection.

By adopting the random action sequence and by combining the image captured by the image sensor and the information detected by the non-image sensor, the liveness detection method according to the embodiment of the present disclosure not only can prevent attacks by means of the pictures, 3D models and human face masks efficiently, but also is capable of preventing attacks by means of video recorded in advance more efficiently.

According to an embodiment of the present disclosure, the random action instruction can comprise at least two categories of action instructions selected from the group including a first category of action instructions, a second category of action instructions and a third category of action instructions, or the random action instruction sequence can include the third category of action instructions, for example, the random action instruction sequence can only include the third category of action instructions in one embodiment. In one embodiment, whether the first category of action instructions is executed by the living body can be determined by using the image sensor. In one embodiment, whether the second category of action instructions is executed by the living body can be determined by using the at least one non-image sensor. In one embodiment, whether the third category of action instructions is executed by the living body can be determined by using the image sensor and the at least one non-image sensor.

According to an embodiment of the present disclosure, for each first category of action instructions, the heterogeneous information decision module determines whether the action instruction of the first category currently sent by the instruction sending module is executed by the living body according to the image captured by the image sensor; for each second category of action instructions, the heterogeneous information decision module determines whether the action instruction of the second category currently sent by the instruction sending module is executed by the living body according to the information detected by the at least one non-image sensor; and for each third category of action instructions, the heterogeneous information decision module determines whether the action instruction of the third category currently sent by the instruction sending module is executed by the living body according to the image captured by the image sensor and the information detected by the at least one non-image sensor.

Figure 3:
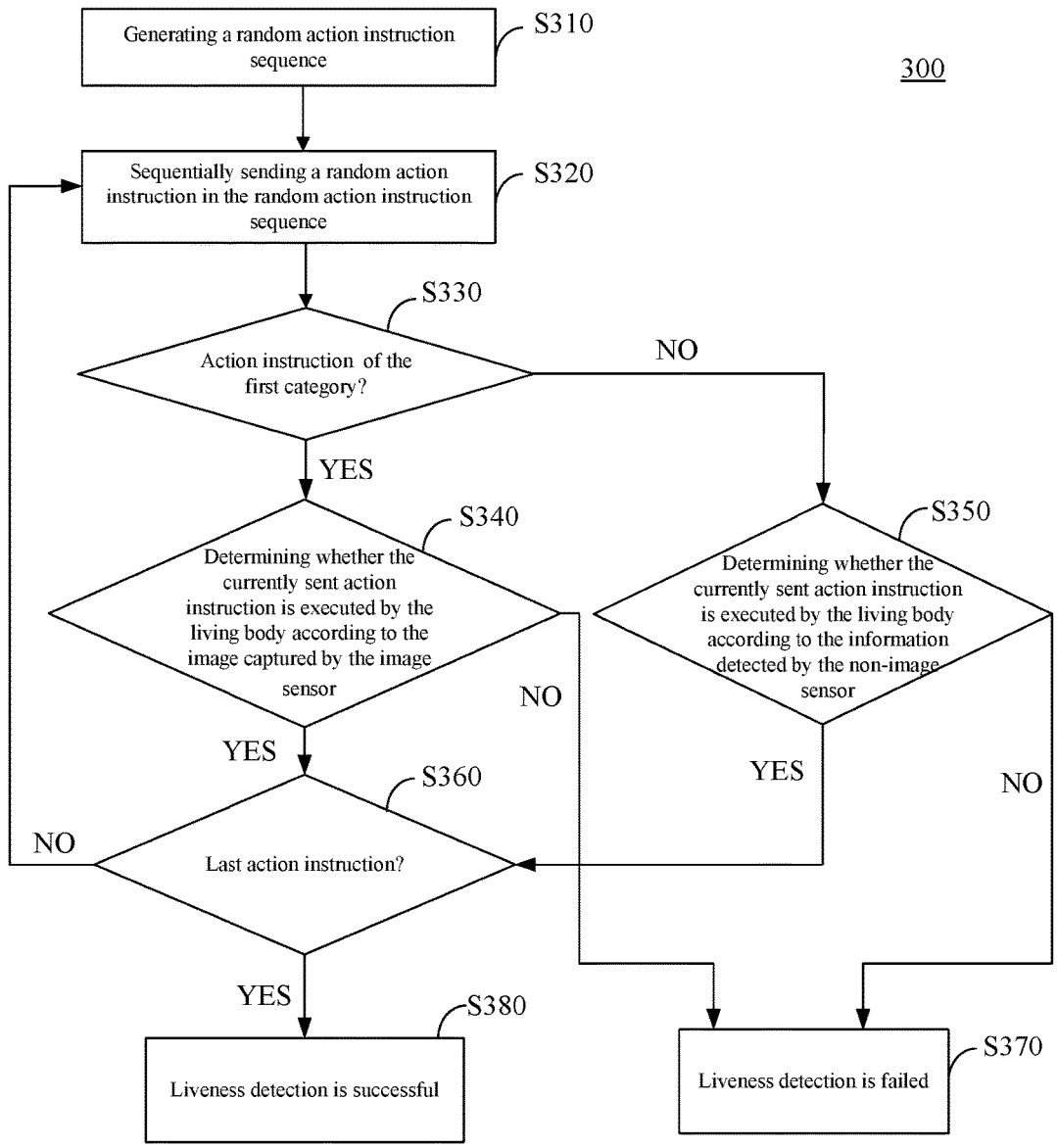
FIG. 3 is a more detailed flowchart of a liveness detection method according to a first embodiment of the present disclosure.

FIG. 3 shows a more detailed flowchart of a liveness detection method 300 according to a first embodiment of the present disclosure. According to the first embodiment of the present disclosure, the random action instruction sequence comprises the first category of action instructions and the second category of action instructions. Action instructions can be selected from a predetermined action instruction set to generate the random action instruction sequence. The first category of action instructions can comprise, but not limited to, at least one of bowing head, raising head, shaking head, winking eyes, closing eyes, opening mouth, smiling, arching eyebrows, sticking out tongue, smiling and winking eyes, sticking out tongue and winking eyes, opening mouth and raising head, bowing head and smiling, etc. The second category of action instructions can comprise, but not limited to, at least one of moving head close to an electronic device, moving head far away from the electrode device, etc.

In step S310, a random action instruction sequence is generated by an instruction sequence generating module, wherein the random action instruction sequence comprises at least one action instructions of the first category and at least one of action instructions of the second category.

In step S320, an instruction sending module sequentially sends a random action instruction in the random action instruction sequence. In one embodiment, at the beginning of the process, a random action instruction that currently has the highest order in the random action instruction sequence is sent.

In step S330, it is determined whether the currently sent random action instruction is the action instruction of the first category or the action instruction of the second category. In one embodiment, the heterogeneous information decision module determines if the random action instruction currently sent by the instruction sending module is the action instruction of the first category or the action instruction of the second category according to the attribution information of the action instruction. If it is determined that the currently sent random action instruction is action instruction of the first category, the method 300 moves to step S340; if it is determined that the currently sent random action instruction is action instruction of the second category, the method 300 moves to step S350.

In step S340, the heterogeneous information decision module determines whether the action instruction of the first category currently sent by the instruction sending module is executed by the living body according to the image captured by the image sensor. If it is determined that the action instruction of the first category of currently sent by the instruction sending module is executed by the living body, the method 300 moves to step S360; otherwise, the method 300 moves to step S370, and the liveness detection is failed.

Figure 4:
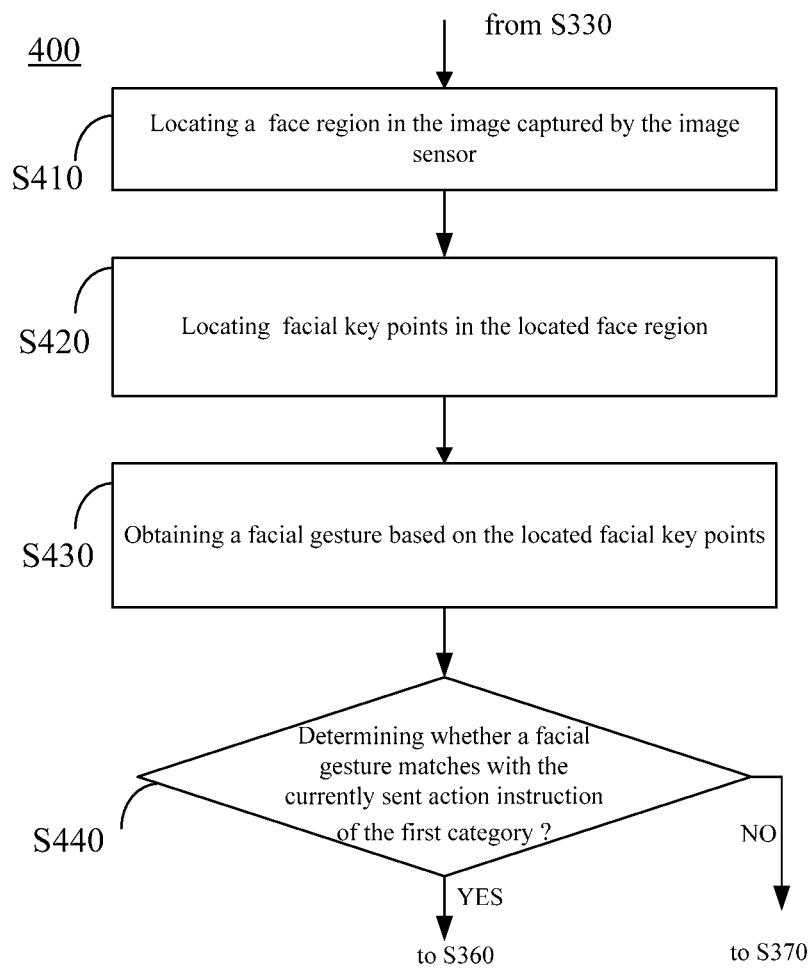
FIG. 4 is a schematic flowchart of a method for determining whether an action instruction of the first category is executed by a living body according to an image captured by an image sensor according to the first embodiment of the present disclosure.

FIG. 4 shows a schematic flowchart of a method 400 for determining whether the currently sent action instruction of the first category is executed by the living body according to the image captured by the image sensor according to the first embodiment of the present disclosure. In one embodiment, the determination is made by the heterogeneous information decision module in combination with a first processing module in the liveness detection device.

In step S410, a face region is located in the image captured by the image sensor. In this step, the first processing module determines whether a face is shown in the image captured by the image sensor, and if a face is shown in the image, the first processing module locates the face region in the image captured by the image sensor. In one embodiment, a face detector which has been trained well in advance can be utilized by the first processing module to locate the face region in the image captured by the image sensor. For example, the face detector can be trained by using face detection and recognition algorithms, such as Haar algorithm and Adaboost algorithm, in advance on the basis of a large amount of pictures. For an input single frame image, the face detector which is trained well in advance is capable of locating the face region quickly. In addition, for multiple frame images captured by the image sensor continuously, after the face region is located in a first frame image, a position of the face region in the current frame image can be tracked in real time based on a position of the face region in a previous frame image of a current frame image.

In step S420, the first processing module locates facial key points in the located face region. The facial key points may be some key points on the face with strong representation capability, for example, eyes, corners of eyes, center of eyes, eyebrows, nose, nose tip, mouth, corners of mouth and facial outline and so on. A key point locater which has been trained well in advance can be utilized by the first processing module to locate the facial key points in the located face region. For example, the key point locater can be trained by utilizing cascade regression method on the basis of face pictures having multiple artificial marks in advance. Alternatively, a conventional facial key point positioning method can also be adopted, wherein based on a parameter shape model, a parameter model is learned according to the performance characteristics nearby the key points. The positions of the key points are optimized iteratively by using the parameter model, and finally the coordinates of the key points are obtained.

It shall be understood that the present disclosure is not limited to a face detecting method and a facial key point positioning method particularly adopted. Either the existing face detecting method and facial key point positioning method or a face detecting method and facial key point positioning method to be developed in future can be applicable to the liveness detection method according to the embodiment of the present disclosure, and shall also fall into the protection scope of the present disclosure.

In step S430, a facial gesture is obtained based on located facial key points by the first processing module. A facial gesture can be obtained based on the located facial key points by utilizing a facial gesture detector which has been trained well. For example, the facial gesture detector can be trained by utilizing a deep convolutional neural network in advance on the basis of the face pictures having multiple artificial masks. Preferably, the facial gesture detector can be a 3D facial gesture detector. For an input face image and/or the located facial key points, three angles, such as the face looking up or looking down, the face rotating left or right and camera rotation, can be determined, and the 3D facial gesture can be further determined. For example, various face pictures with facial gestures prescribed in advance can be obtained in advance, facial key points and specific facial gestures can be marked artificially, and a facial gesture model database can be established in advance through a machine learning method.

Corresponding to the first category of action instructions, the facial gestures can comprise, but not limited to, at least one of bowing head, raising head, shaking head, winking eyes, closing eyes, opening mouth, smiling, arching eyebrows, sticking out tongue, smiling and winking eyes, sticking out tongue and winking eyes, opening mouth and raising head, bowing head and smiling, etc.

Then, the heterogeneous information decision module determines in step S440 whether an obtained facial gesture matches with the action instruction of the first category currently sent by the instruction sending module, and if the obtained facial gesture matches with the currently sent action instruction of the first category, the heterogeneous information decision module determines that the currently sent action instruction of the first category is executed by the living body; otherwise, if the obtained facial gesture does not match with the currently sent action instruction of the first category, the heterogeneous information decision module determines that the currently sent action instruction of the first category is not executed by the living body.

Returning to FIG. 3, the heterogeneous information decision module determines in step S350 whether the action instruction of the second category currently sent by the instruction sending module is executed by the living body according to the information detected by the at least one non-image sensor. In the case of determining that the currently sent action instruction of the second category is executed by the living body, the method 300 moves to step S360 to determine if the currently sent action instruction is the last random action instruction in the random action instruction sequence; otherwise, in the case of determining that the currently sent action instruction of the second category is not executed by the living body, the method 300 moves to step S370 and it is determined that the liveness detection is failed.

In Step S360, it is determined whether the currently sent random action instruction is the last random action instruction in the random action instruction sequence. In one embodiment, the instruction sending module determines if the currently sent random action instruction is the last random action instruction in the random action instruction sequence. If the currently sent random action instruction is determined to be not the last random action instruction in the random action instruction sequence, the method 300 moves to step S320 to sequentially send a next random action instruction, e.g., the random action instruction with the highest order currently in the random action instruction sequence. In the case of determining that the currently sent random action instruction is the last random action instruction in the random action instruction sequence, the method 300 moves to step S380, and it is determined that the liveness detection is successful.

As an example, in the first embodiment of the present disclosure, the electronic device comprises an image sensor, a light sensor and a distance sensor, and the random action instruction sequence comprises three random action instructions: shaking head, bowing head, and moving head close to the electronic device.

For the action instruction of shaking head, which is the action instruction of the first category, whether the action instruction of shaking head is executed by the living body can be determined by performing method 400. More specifically, facial gesture can be obtained by performing steps S410-S430, and it can be determined whether a left or right rotation angle is greater than a predetermined rotation angle threshold within a predetermined period of time based on the obtained facial gesture in step S440, and in the case of determining that the left or right rotation angle is greater than the predetermined rotation angle threshold within the predetermined period of time, the heterogeneous information decision module determines that the obtained facial gesture matches with the action instruction of shaking head currently sent by the by the instruction sending module, and the currently sent action instruction of shaking head is executed by the living body.

For the action instruction of bowing head, which is action instruction of the first category, similarly, in step S440, it can be determined whether a looking down/up angle is greater than a predetermined looking down/up angle threshold within a predetermined period of time based on the obtained facial gesture, and in the case of determining that the looking down/up angle is greater than the predetermined looking down/up angle threshold within the predetermined period of time, the heterogeneous information decision module determines that the obtained facial gesture matches with the currently sent action instruction of bowing head, and the currently sent action instruction of bowing head is executed by the living body.

For the action instruction of moving head close to the electronic device, which is the action instruction of the second category, whether the action instruction of moving head close to the electronic device is executed by the living body can be determined by performing step S350. In step S350, a distance between a distance sensor and a human face can be obtained through the distance sensor, and light intensity can be obtained by the light sensor. Variation of distance between the electronic device and the human face is obtained based on the distance obtained by the distance sensor, and variation of light intensity is obtained based on the light intensity obtained by the light sensor. Since the light intensity detected by the light sensor is approximate to the light intensity actually emitted on the human face, when the distance between the electronic device and the human face varies, the light intensity detected by the light sensor also varies accordingly, and the light intensity variation is related to the distance variation. In the case of determining that the human face is close to the electronic device based on the distance variation of the electronic device relative to the human face, if the light intensity variation is greater than a first variation threshold (i.e., the light intensity variation is too dramatic) or the light intensity variation (i.e., there is almost no light intensity variation or the light intensity variation is too small) is smaller than a second variation threshold (herein, the first variation threshold is greater than the second variation threshold), then the liveness detection is determined to be failed. In this case, the image captured by the image sensor is more likely to be a video played by a liquid crystal screen than a human face reflecting natural lights.

In the liveness detection method according to the first embodiment of the present disclosure, the random action instruction sequence comprises two categories of action instructions, whether the first category of action instructions is executed by the living body is determined according to the image captured by the image sensor, and whether the second category of action instructions is executed by the living body is determined according to the information detected by the at least one non-image sensor. The image captured by the image sensor and the information detected by the at least one non-image sensor can be further combined to perform liveness detection, so the flexibility and accuracy of the liveness detection can be improved.

Figure 5:
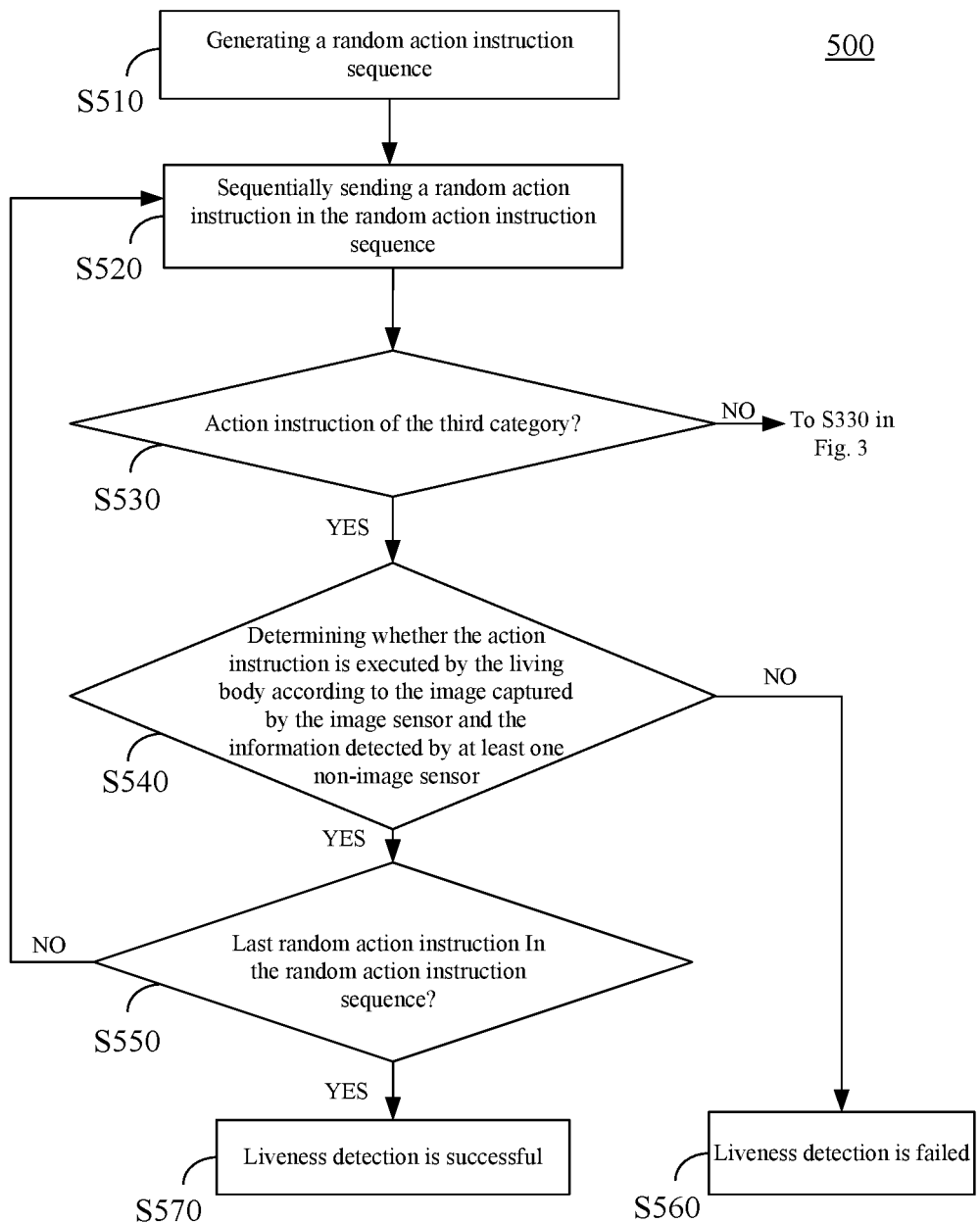
FIG. 5 is a more detailed flowchart of a liveness detection method according to a second embodiment of the present disclosure.

FIG. 5 shows a schematic flowchart of a liveness detection method 500 according to a second embodiment of the present disclosure. According to the second embodiment of the present disclosure, the random action instruction sequence comprises a third category of action instruction. The third category of action instructions can comprise but not limited to, at least one of moving head close to the electronic device, swinging the electronic device drastically and so on.

In step S510, a random action instruction sequence is generated by an instruction sequence generating module, and the random action instruction sequence comprises at least one action instruction of the third category.

In step S520, a random instruction in the random action sequence is sequentially sent by an instruction sending module. In one embodiment, a random action instruction currently with the highest order in the random action instruction sequence is sent by the instruction sending module.

In step S530, it is determined whether the currently sent random action instruction is the action instruction of the third category. In one embodiment, a heterogeneous information decision module determines if the random action instruction currently sent by the instruction sending module is the action instruction of the third category according to the attribution information of the action instruction. In the case of determining that the currently sent random action instruction is the action instruction of the third category, the method 500 moves to step S540. In the case of determining that the currently sent random action instruction is not the third category of action instruction, the method 500 can move to step S330 for determining whether the random instruction currently sent is action instruction of the first category according to the first embodiment of the present disclosure.

In step S540, the heterogeneous information decision module determines whether the action instruction of the third category currently sent is executed by the living body according to the image captured by the image sensor and the information detected by at least one non-image sensor. In the case of determining that the action instruction of the third category currently sent is executed by the living body, the method 500 moves to step S550; otherwise, in the case of determining that the action instruction of the third category currently sent is not executed by the living body, the method 500 moves to step S560, and it is determined that the liveness detection is failed.

In one embodiment, by collecting multiple valid information sequences in advance, a corresponding action can be determined for each valid information sequence, and by collecting multiple invalid information sequences not matching with individual actions in advance, an information sequence database is produced. First detection information can be generated based on the image captured by the image sensor, second detection information is generated based on the information detected by the non-image sensor, and the first detection information and the second detection information are combined to form a current detection information sequence. Then, the heterogeneous information decision module determines, based on the current detection information sequence and the valid information sequence and the invalid information sequence in the information sequence database, whether the current detection information sequence is a valid information sequence, and further determines an action corresponding to the current detection information sequence accordingly. For example, the current detection information sequence can be classified by using a long short term memory (LSTM) model, so that a corresponding action is output if the current detection information sequence is determined to be a valid information sequence, and the current detection information sequence is indicated invalid in the case that the current detection information sequence is determined to be an invalid information sequence.

Alternatively, the first detection information can be generated by a first processing module based on the image captured by the image sensor, and first decision information is generated by the heterogeneous information decision module based on a first part of the first detection information; and the second detection information can be generated by a second processing module based on the information detected by the at least one non-image sensor, and second decision information is generated by the heterogeneous information decision module based on the second detection information or based on a second part of the first detection information and the second detection information. And the heterogeneous information decision module determines whether the random action instruction is executed by the living body based on the first decision information and the second decision information.

Then, it is determined in step S550 whether the currently sent random action instruction is the last random action instruction in the random action instruction sequence. In one embodiment, the instruction sending module determines if the currently sent random action instruction is the last random action instruction in the random action instruction sequence. If the currently sent random action instruction is determined to be not the last random action instruction in the random action instruction sequence, the method 500 moves to step S520 to sequentially send a next random action instruction, e.g., the random action instruction with the highest order currently in the random action instruction sequence. In the case of determining that the currently sent random action instruction is the last random action instruction in the random action instruction sequence, the method 500 moves to step S570, and it is determined that the living body is detected and the liveness detection is successful.

Figure 6:
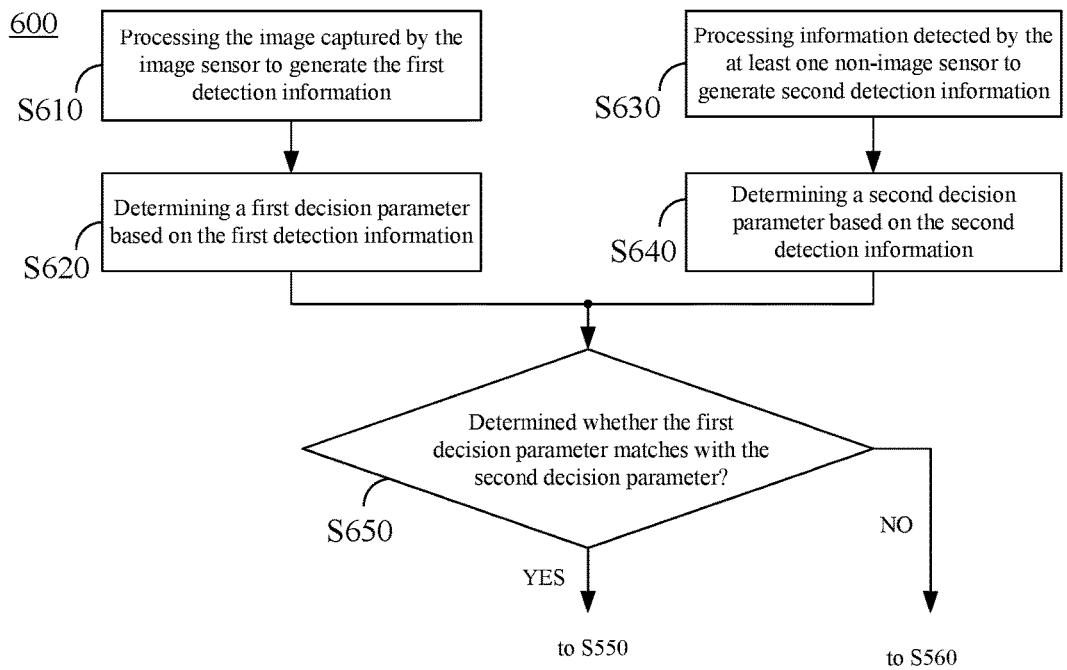
FIG. 6 is a schematic flowchart of a method for determining whether an action instruction of the third category is executed by a living body according to an image captured by an image sensor and information detected by a non-image sensor in the liveness detection method according to the second embodiment of the present disclosure.

FIG. 6 shows a more particular schematic flowchart of a method 600 for determining whether the action instruction of the third category currently sent is executed by the living body according to the image captured by the image sensor and the information detected by at least one non-image sensor according to the liveness detection method 500 of the second embodiment of the present disclosure.

In step S610, the image captured by the image sensor is processed by the first processing module to generate the first detection information. The first detection information can comprise at least one of facial gesture, facial key points, image texture information, image luminance and object in the image.

In particular, an object can be recognized in the image captured by the image sensor, a face region can be located in the image captured by the image sensor, image luminance can be detected in the image captured by the image sensor or in the located face region, the facial key points can be located in the located face region, the facial gesture can be obtained based on the located facial key points, the image texture information can be extracted in the located face region, and the image texture information can comprise at least one of skin texture and hair characteristic.

Next, in step S620, a first decision parameter is determined based on the first detection information. In one embodiment, the first decision parameter can be determined based on the first detection information by the heterogeneous information decision module.

In step S630, information detected by the at least one non-image sensor is processed to generate second detection information by the second processing module.

Next, in step S640, a second decision parameter is determined based on the second detection information. In one embodiment, the second decision parameter can be determined based on the second detection information by the heterogeneous information decision module.

According to the embodiment of the present disclosure, the at least one non-image sensor comprises at least one of a light sensor, a distance sensor, an acceleration sensor, and gyroscope, and the second detection information comprises at least one of light intensity, distance information, acceleration information, and gyroscope information.

Then, in step S650, the heterogeneous information decision module determines whether the first decision parameter matches with the second decision parameter. If the first decision parameter matches with the second decision parameter, the method 600 moves to step S550 for determining if the currently sent random action instruction is the last random action instruction in the random action instruction sequence, and if the first decision parameter does not match with the second decision parameter, the method 600 moves to step S560, in which the heterogeneous information decision module determines that the liveness detection is failed.

According to the embodiment of the present disclosure, the first decision parameter includes at least one of size and/or size variation of an object recognized in the captured image, distance and/or distance variation among objects in the captured image, image luminance variation in the captured image, image luminance variation in a located face region, the facial gesture, distance and/or distance variation among facial key points in the captured image, and image texture information in the captured image; and the second decision parameter includes at least one of light intensity and/or intensity variation, a distance and/or distance variation of the object recognized in the captured image relative to the distance sensor, a spatial position and/or spatial position variation of the object recognized in the captured image relative to the acceleration sensor and/or gyroscope.

As an example, in the second embodiment of the present disclosure, the electronic device comprises an image sensor and a non-image sensor of distance sensor, and the random action instruction sequence comprises random action instruction of moving head close to the electronic device. In this example, the first detection information can be image texture information, and the second detection information can be distance information of the electronic device relative to the human face. Distance of the distance sensor relative to the human face can be obtained through the distance sensor, distance variation of the electronic device relative to the human face is obtained based on the distance obtained by the distance sensor, and when the distance is determined as being closer by the distance sensor, the second decision parameter can be distance reduction. When the image texture information comprises the skin texture or the hair characteristic, the first decision parameter can be a close distance. In this case, the heterogeneous information decision module can determine that the first decision parameter matches with the second decision parameter, and the heterogeneous information decision module can further determine that the action instruction of the third category currently sent is executed by the living body. Otherwise, when the image texture information does not comprise skin texture or skin characteristic, the first decision parameter can be a non-close distance. In this case, the heterogeneous information decision module can determine that the first decision parameter does not match with the second decision parameter, and then determine that the third category of action instruction currently sent is not executed by the living body.

As another example, in the second embodiment of the present disclosure, the electronic device comprises an image sensor and two non-image sensors of a distance sensor and a light sensor, and the random action instruction sequence comprises moving head close to the electronic device which can be determined as the action instruction of the third category. In this example, the first detection information can be image texture information, and the second detection information can comprise distance information of the electronic device relative to the human face and light intensity information. The distance between the distance sensor and the human face can be obtained through the distance sensor, the distance variation of the electronic device relative to the human face is obtained based on the distance obtained by the distance sensor, and when the distance is determined as being closer by the distance sensor, the second decision parameter can be distance reduction. The light intensity information can be detected through the light detector. Since the light intensity detected by the light sensor is approximate to the light intensity actually emitted on the human face, and since the human face image luminance is related to the light intensity actually emitted on the human face, information of light intensity detected by the light sensor can also be related to human face image luminance. In one embodiment, the first detection information comprises the human face image luminance. The first decision parameter can be that the human face image luminance matches with or is related to the light intensity information in the second detection information, can be that the human face image luminance variation matches with or is related to the light intensity information variation, or can be distance reduction. In this case, the heterogeneous information decision module can determine that the first decision parameter matches with the second decision parameter, and then further determine that the third category of action instruction currently sent is executed by the living body. Otherwise, when the first decision parameter is the human face image luminance unrelated to the light intensity information in the second detection information, or when the first decision parameter is that the human face image luminance does not match with or is not related to the light intensity information, or when the first decision parameter is distance increase, the heterogeneous information decision module can determine that the first decision parameter does not match with the second decision parameter, and then further determine that the third category of action instruction currently sent is not executed by the living body.

As another example, in the second embodiment of the present disclosure, the electronic device is a smart phone, and the smart phone comprises an image sensor and two non-image sensors of an acceleration sensor and a gyroscope, and the random action instruction sequence comprises swinging the smart phone drastically, which can be determined as the action instruction of the third category. In this example, the first detection information can be facial gesture, and the second detection information can comprise acceleration information and gyroscope information. The first decision parameter can be facial gesture, and the second decision parameter can be angle information (or orientation information) of the human face relative to the smart phone. When the heterogeneous information decision module determines that the first decision parameter matches with the second decision parameter, that is, when determining that the facial gesture matches with the angle information (or orientation information), the heterogeneous information decision module determines that the action instruction of the third category currently sent is executed by the living body. Otherwise, when determining that the first decision parameter does not match with the second decision parameter, the heterogeneous information decision module determines that the action instruction of the third category currently sent is not executed by the living body.

The liveness detection method according to the second embodiment of the present disclosure determines whether a certain action instruction is executed by the living body according to the image captured by the image sensor and the information detected by at least one non-image sensor. The image captured by the image sensor and the information detected by the at least one non-image sensor can be combined to perform the liveness detection, so that flexibility and accuracy of the liveness detection can be improved.

Figure 7:
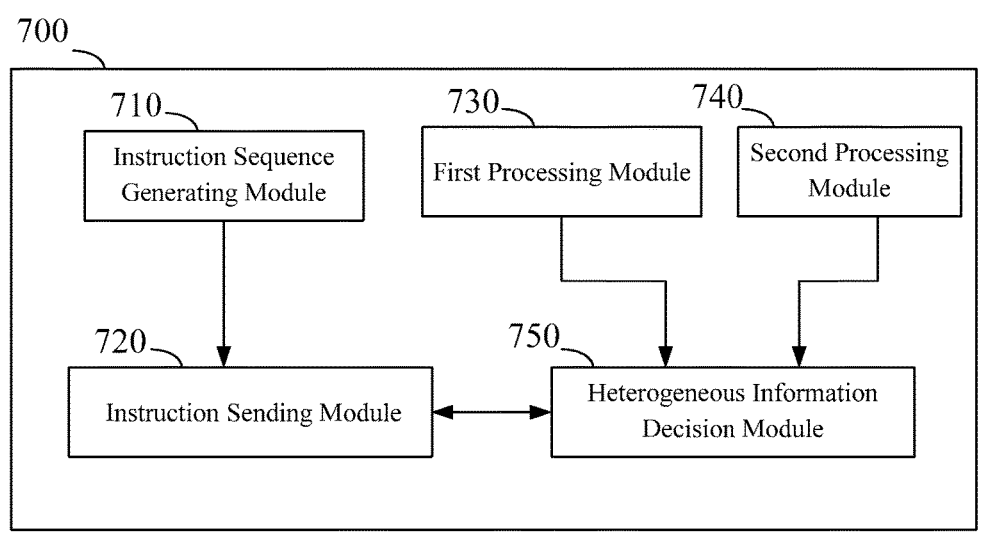
FIG. 7 is a schematic block diagram of a liveness detection apparatus according to an embodiment of the present disclosure.

FIG. 7 shows a schematic block diagram of a liveness detection apparatus 700 according to an embodiment of the present disclosure.

As shown in FIG. 7, the liveness detection apparatus 700 according to the embodiment of the present disclosure comprises an instruction sequence generating module 710, an instruction sending module 720, a first processing module 730, a second processing module 740, and a heterogeneous information decision module 750.

The instruction sequence generating module 710 is configured to generate a random action instruction sequence including at least one random action instruction. The instruction sequence generating module 710 can be implemented by the processor 102 in the electronic device as shown in FIG. 1 executing the program instructions stored in the storage means 104, and can perform steps S210, S310 and S510 in the liveness detection method according to the embodiment of the present disclosure.

The instruction sending module 720 is configured to sequentially send a random action instruction in the random action instruction sequence. In one embodiment, the sequentially sent random action instruction can be output via an output module for being executed accordingly. The instruction sending module 720 can be implemented by the processor 102 in the electronic device as shown in FIG. 1 executing the program instructions stored in the storage means 104, and can perform steps S220, S320 and S520 and steps S360 and S550 in the liveness detection method according to an embodiment of the present disclosure.

The first processing module 730 is configured to process an image captured by an image sensor to generate first detection information. The first processing module 730 can be implemented by the processor 102 in the electronic device as shown in FIG. 1 executing the program instructions stored in the storage means 104, and can perform a part of step S340 and steps S410, S420 and S430 in the liveness detection method according to the first embodiment of the present disclosure, and can further perform a part of step S540 and step S610 in the liveness detection method according to the second embodiment of the present disclosure.

The second processing module 740 is configured to process information detected by at least one non-image sensor to produce second detection information. The second processing module 740 can be implemented by the processor 102 in the electronic device as shown in FIG. 1 executing the program instructions stored in the storage means 104, and can perform a part of step S350 in the liveness detection method according to the first embodiment of the present disclosure, and can further perform a part of step S540 and step S630 in the liveness detection method according to the second embodiment of the present disclosure.

The heterogeneous information decision module 750 is configured to receive the sequentially sent random action instruction and determine whether the sequentially sent random action instruction in the random action instruction sequence is executed by a living body based on the first detection information and the second detection information, and is configured to determine that the living body is detected successfully if the random action instruction sequentially sent by the instruction giving module is sequentially executed by the living body. The heterogeneous information decision module 750 can be implemented by the processor 102 in the electronic device as shown in FIG. 1 executing the program instructions stored in the storage means 104, and can perform a part of steps S340 and S350, steps S370 and S380, and step S440 in the liveness detection method according to the first embodiment of the present disclosure, and can further perform a part of step S540, steps S560 and S570 and steps S620, S640 and S650 in the liveness detection method according to the second embodiment of the present disclosure.

According to the embodiment of the present disclosure, the heterogeneous information decision module 750 determines that the liveness detection is failed if the random action instruction currently sent by the instruction sending module 720 is not executed by the living body. In the case that the random action instruction currently sent by the instruction sending module 720 is not the last action instruction in the random action instruction sequence, the instruction sending module 720 sends a next random action instruction when the heterogeneous information decision module 750 determines that the random action instruction currently sent by the instruction sending module 720 is executed by the living body.

According to the embodiment of the present disclosure, the random action instruction sequence comprises at least two categories of action instructions selected from the group comprising a first category of action instructions, a second category of action instructions and a third category of action instructions, or the random action instruction sequence comprises only the third category of action instructions. For each first category of action instructions, the heterogeneous information decision module 750 determines whether the action instruction of the first category currently sent by the instruction sending module 720 is executed by the living body according to the first detection information generated by the first processing module 730; for each second category of action instructions, the heterogeneous information decision module 750 determines whether the action instruction of the second category currently sent by the instruction sending module 720 is executed by the living body according to the second detection information generated by the second processing module 740; for each third category of action instructions, the heterogeneous information decision module 750 determines whether the of action instruction of the third category currently sent by the instruction giving module 720 is executed by the living body according to both the first detection information generated by the first processing module 730 and the second detection information generated by the second processing module 740.

Figure 8:
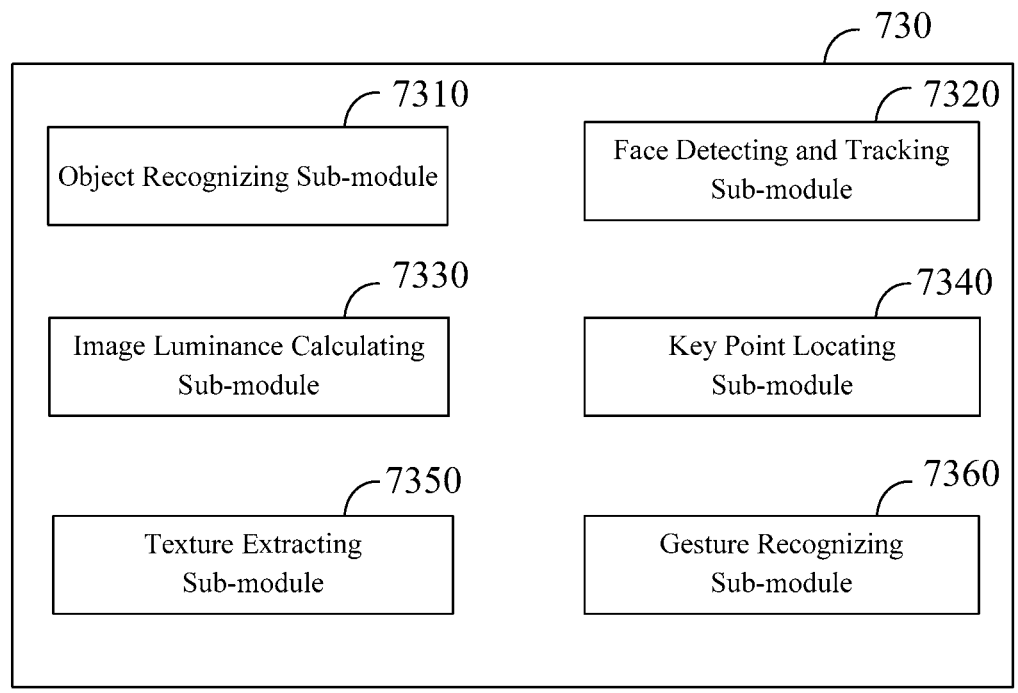
FIG. 8 is a schematic block diagram of a first processing module in a liveness detection apparatus according to an embodiment of the present disclosure.

FIG. 8 shows a schematic block diagram of the first processing module 730 in the liveness detection device 700 according to the embodiment of the present disclosure.

As shown in FIG. 8, the first processing module 730 can comprise an object recognizing sub-module 7310, a face detecting and tracking sub-module 7320, an image luminance calculating sub-module 7330, a key point locating sub-module 7340, a texture extracting sub-module 7350 and a gesture recognizing sub-module 7360.

The object recognizing sub-module 7310 is configured to recognize an object in the image captured by the image sensor. In one embodiment, the object recognizing sub-module 7310 can be implemented by the processor 102 in the electronic device as shown in FIG. 1 executing the program instructions stored in the storage means 104.

The face detecting and tracking sub-module 7320 is configured to locate a human face region in the image captured by the image sensor. The face detecting and tracking sub-module 7320 can be a human face detector, which can be implemented by the processor 102 in the electronic device as shown in FIG. 1 executing the program instructions stored in the storage means 104, and can perform step S410 in the liveness detection method according to the embodiment of the present disclosure.

The image luminance calculating sub-module 7330 is configured to calculate image luminance (for example, average image luminance) in the image captured by the image sensor, or calculate image luminance (for example, average image luminance) in the located human face region. In one embodiment, the image luminance calculating sub-module 7330 can be implemented by the processor 102 in the electronic device as shown in FIG. 1 executing the program instructions stored in the storage means 104.

The key point locating sub-module 7340 is configured to locate the human facial key points in the located human face region. In one embodiment, the key point locating sub-module 7340 can be implemented by the processor 102 in the electronic device as shown in FIG. 1 executing the program instructions stored in the storage device 104, and can perform step S420 of the liveness detection method according to the embodiment of the present disclosure.

The texture extracting sub-module 7350 is configured to extract image texture information in the located human face region. The image texture information comprises at least one of skin texture and hair characteristic. In one embodiment, the texture extracting sub-module 7350 can be implemented by the processor 102 in the electronic device as shown in FIG. 1 executing the program instructions stored in the storage means 104.

The gesture recognizing sub-module 7360 is configured to obtain a human facial gesture based on the located human facial key points. In one embodiment, the gesture recognizing sub-module 7360 can be implemented by the processor 102 in the electronic device as shown in FIG. 1 executing the program instructions stored in the storage means 104.

According to the embodiment of the present disclosure, the first detection information comprises at least one of the facial gesture, the facial key points, the image texture information, the image luminance and the object. The at least one non-image sensor comprises at least one of the light sensor, the distance sensor, the acceleration sensor, and the gyroscope. The second detection information comprises at least one of light intensity, distance information, acceleration information and gyroscope information.

For each action instruction of the first category, in the case that the facial gesture does not match with the currently sent action instruction of the first category, the heterogeneous information decision module 750 determines that the liveness detection is failed.

For each action instruction of the third category, the heterogeneous information decision module 750 determines a first decision parameter based on the first detection information, determines a second decision parameter based on the second detection information, and determines that the liveness detection is failed in the case of determining that the first decision parameter does not match with the second decision parameter.

According to the embodiment of the present disclosure, the first decision parameter includes at least one of size and/or size variation of an object recognized in an image captured by the image sensor, distance and/or distance variation among objects in the captured image, image luminance variation in the captured image, image luminance variation in a located face region, the facial gesture, distance and/or distance variation among facial key points in the captured image, and image texture information in the captured image.

According to the embodiment of the present disclosure, the second decision parameter includes at least one of light intensity and/or intensity variation, a distance and/or distance variation of an object recognized in the captured image relative to the distance sensor, a spatial position and/or spatial position variation of the object recognized in the captured image relative to the acceleration sensor and/or gyroscope.

Figure 9:
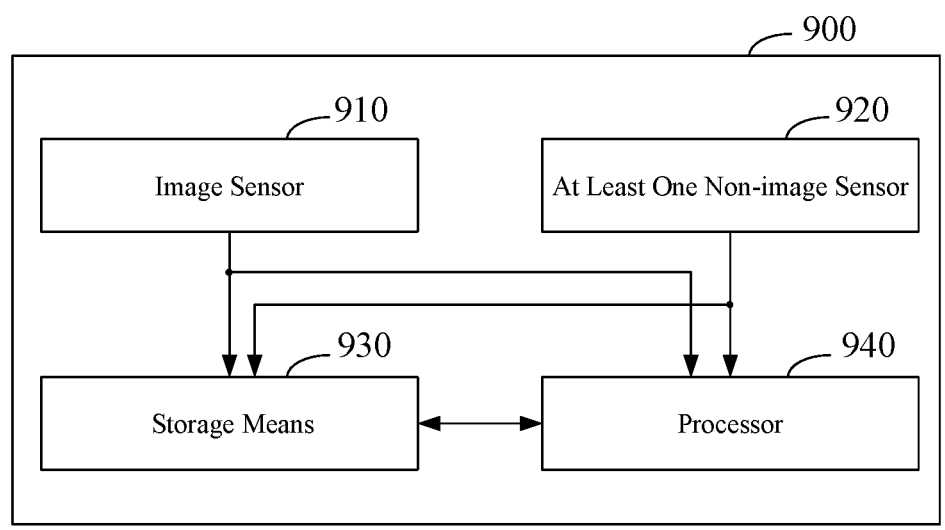
FIG. 9 is a schematic block diagram of a liveness detection apparatus according to an embodiment of the present disclosure.

FIG. 9 is a schematic block diagram of an image detecting apparatus 900 according to an embodiment of the present disclosure. The image detecting apparatus 900 comprises an image sensor 910, at least one non-image sensor 920, a storage means 930, and a processor 940.

The image sensor 910 is configured to capture an image. The at least one non-image sensor 920 is configured to detect information, and comprises at least one of a light sensor, a distance sensor, an acceleration sensor, and a gyroscope. The information detected by the at least one non-image sensor comprises at least one of light intensity, distance information, acceleration information, and gyroscope information.

The storage means 930 stores program codes used to implement corresponding steps in the liveness detection method according to the embodiment of the present disclosure.

The processor 940 is configured to execute the program codes stored in the storage means 930 to perform corresponding steps in the liveness detection method according to the embodiment of the present disclosure, and is configured to implement the instruction sequence generating module 710, the instruction sending module 720, the first processing module 730, the second processing module 740, and the heterogeneous information decision module 750 in the liveness detection apparatus according to the embodiment of the present disclosure.

In addition, according to an embodiment of the present disclosure, there is further provided a storage medium upon which program instructions are stored. When being executed by a computer or a processor, the program instructions are used to cause the computer or the processor to perform corresponding steps of the liveness detection method according to the embodiment of the present disclosure, and are used to cause the computer or the processor to implement corresponding modules in the liveness detection apparatus according to the embodiment of the present disclosure. The storage medium can comprise, for example, a memory card of a smart phone, storage means of a tablet computer, a hard disc of a personal computer, a read only memory, an erasable programmable read only memory (EPROM), a portable compact disk read only memory (CD-ROM), a USB memory, or any combination of the above storage media.

By adopting the random action sequence and by combining the image captured by the image sensor and the information detected by at least one non-image sensor, the liveness detection method and apparatus and the liveness detection device and storage media according to the embodiment of the present disclosure not only can prevent attacks by means of the picture, 3D model and human face mask efficiently, but also is capable of preventing attacks by means of a video recorded in advance more efficiently.

Although the exemplary embodiments are already described herein by referring to figures, it shall be understood that the above exemplary embodiments are just for illustration, but do not intend to limit the scope of the present disclosure thereto. Those ordinary skilled in the art would make various alternations and amendments without departing from the scope and spirit of the present disclosure. All of these modifications and amendments intend to fall into the scope of the present disclosure claimed in the claims.

What is claimed is:

1. A liveness detection method performed by a processor, comprising:
　　generating a random action instruction sequence including a plurality of random action instructions;
　　sequentially sending a random action instruction in the random action instruction sequence;
　　determining whether the sequentially sent random action instruction in the random action instruction sequence is sequentially executed by a living body based on detection information of at least two sensors, wherein the at least two sensors comprise an image sensor and at least one non-image sensor;
　　determining that the liveness detection is succeeded if the sequentially sent random action instruction in the random action instruction sequence is sequentially executed by the living body; and
　　determining that the liveness detection is failed if a currently sent random action instruction is determined to not be executed by the living body, wherein the random action instruction sequence at least comprises a third category of action instructions, for each third category of action instructions, the method further comprises: determining, by said processor, a first decision parameter based on a first detection information obtained from the image captured by the image sensor, determining, by said processor, a second decision parameter based on a second detection information generated by the at least one non-image sensor, and determining, by said processor, that the liveness detection is failed if the first decision parameter does not match with the second decision parameter, and wherein in the case that the currently sent random action instruction is not a last random action instruction in the random action instruction sequence, a next random action instruction is sent when the currently sent random action instruction is determined to be executed by the living body.

2. The liveness detection method according to claim 1, wherein the random action instruction sequence further comprises at least two categories of action instructions selected from a group comprising a first category of action instructions, a second category of action instructions, and a third category of action instructions, wherein the method further comprises:
for each first category of action instructions, determining whether a currently sent action instruction of the first category is executed by the living body according to an image captured by the image sensor;
for each second category of action instructions, determining whether a currently sent action instruction of the second category is executed by the living body according to the information detected by the at least one non-image sensor; and
for each third category of action instructions, determining whether a currently sent action instruction of the third category is executed by the living body according to the image captured by the image sensor and the information detected by the at least one non-image sensor.

3. The liveness detection method according to claim 2, further comprising: processing information detected by the at least one non-image sensor to generate second detection information, and the liveness detection method further comprises at least one step of:
recognizing an object in the image captured by the image sensor;
detecting image luminance in the image captured by the image sensor;
locating a face region in the image captured by the image sensor;
locating facial key points in the located face region;
extracting image texture information in the located face region, wherein the image texture information comprises at least one of skin texture and hair characteristic; and
obtaining a facial gesture based on the located facial key points,
wherein the first detection information obtained from the image captured by the image sensor comprises at least one of the facial gesture, the facial key points, the image texture information, the image luminance, and the object.

4. The liveness detection method according to claim 3, wherein if the first detection information comprises the facial gesture, the method further comprises:
for each first category of action instructions, determining that the liveness detection is failed when the facial gesture does not match with the currently sent action instruction of the first category.

5. The liveness detection method according to claim 1, wherein the at least one non-image sensor comprises at least one of a light sensor, a distance sensor, an acceleration sensor and a gyroscope, and
wherein the second detection information comprises at least one of light intensity, distance information, acceleration information, and gyroscope information.

6. The liveness detection method according to claim 5, wherein
the first decision parameter comprises at least one of size and/or size variation of the object in the captured image, distance and/or distance variation among objects in the captured image, image luminance variation in the captured image, image luminance variation in the located facial region, the facial gesture, distance and/or distance variation among facial key points in the captured image, and the image texture information in the captured image, and
wherein the second decision parameter comprises at least one of light intensity and/or light intensity variation, a distance and/or distance variation of the object in the captured image relative to the distance sensor, a spatial position and/or spatial position variation of the object in the captured image relative to the acceleration sensor and/or the gyroscope.

7. A liveness detection device, comprising:
an image sensor configured to capture an image;
at least one non-image sensor configured to detect information;
at least one storage means configured to store program instructions; and
at least one processor configured to execute the program instructions stored in the at least one storage means to:
generate a random action instruction sequence including a plurality of random action instructions;
sequentially send a random action instruction in the random action instruction sequence;
process the image captured by the image sensor to generate first detection information;
process the information detected by at the least one non-image sensor to generate second detection information;
determine whether the sequentially sent random action instruction in the random action instruction sequence is sequentially executed by a living body based on the first detection information and the second detection information;
determine that the liveness detection is succeeded if the sequentially sent random action instruction in the random action instruction sequence is sequentially executed by the living body; and
determine that the liveness detection is failed if a currently sent random action instruction is determined to not be executed by the living body,
wherein the random action instruction sequence at least comprises a third category of action instructions, for each third category of action instructions, said at least one processor determines a first decision parameter based on the first detection information, determines a second decision parameter based on the second detection information, and determines that the liveness detection is failed if the first decision parameter does not match with the second decision parameter,
wherein in the case that the currently sent random action instruction is not a last action instruction in the random action instruction sequence, said at least one processor sends a next random action instruction when the currently sent random action instruction is determined to be executed by the living body.

8. The liveness detection device according to claim 7, wherein the random action instruction sequence comprises at least two categories of action instructions selected from a group comprising a first category of action instructions, a second category of action instructions and a third category of action instructions;
wherein for each first category of action instructions, said at least one processor determines whether a currently sent action instruction of the first category is executed by the living body according to the first detection information;

for each second category of action instructions, said at least one processor determines whether a currently sent action instruction of the second category is executed by the living body according to the second detection information; and for each third category of action instructions, said at least one processor determines whether the currently sent action instruction of the third category is executed by the living body according to the first detection information and the second detection information.

9. The liveness detection device according to claim 8, wherein the first detection information comprises at least one of facial gesture, facial key points, image texture information, image luminance, and an object recognized in the image captured by the image sensor.

10. The liveness detection device according to claim 9, wherein when the first detection information comprises the facial gesture, for each first category of action instructions, said at least one processor determines that the liveness detection is failed if the facial gesture does not match with the currently sent first category of action instruction.

11. The liveness detection device according to claim 7, wherein the at least one non-image sensor comprises at least one of a light sensor, a distance sensor, an acceleration sensor and a gyroscope, and wherein the second detection information comprises at least one of light intensity, distance information, acceleration information, and gyroscope information.

12. The liveness detection device according to claim 11, wherein the first decision parameter comprises at least one of size and/or size variation of an object in the captured image, distance and/or distance variation among objects in the captured image, image luminance variation in the captured image, image luminance variation in a located face region, the facial gesture, distance and/or distance variation among facial key points in the captured image, and image texture information in the captured image; and wherein the second decision parameter comprises at least one of light intensity and/or light intensity variation, a distance and/or distance variation of the object in the captured image relative to the distance sensor, a spatial position and/or spatial position variation of the object in the captured image relative to the acceleration sensor and/or the gyroscope.

13. A non-transitory computer readable storage medium with program instructions recorded thereon, when being executed by a computer or a processor, the program instructions make the computer or the processor to:

generate a random action instruction sequence including a plurality of random action instructions;

sequentially send a random action instruction in the random action instruction sequence;

process an image captured by an image sensor to generate a first detection information;

process information detected by at least one non-image sensor to generate a second detection information;

determine whether the sequentially sent random action instruction in the random action instruction sequence is sequentially executed by a living body based on detection information of at least two sensors;

determine that the living body is detected if the sequentially sent random action instruction in the random action instruction sequence is sequentially executed by the living body; and determine that the liveness detection is failed if a currently sent random action instruction is determined to not be executed by the living body, wherein the random action instruction sequence at least comprises a third category of action instructions, for each third category of action instructions, when being executed by a computer or a processor, the program instructions make the computer or the processor to determine a first decision parameter based on the first detection information, determines a second decision parameter based on the second detection information, and determine that the liveness detection is failed if the first decision parameter does not match with the second decision parameter, wherein in the case that the currently sent random action instruction is not the last random action instruction in the random action instruction sequence, a next random action instruction is sent when the currently sent random action instruction is determined to be executed by the living body.

14. The non-transitory computer readable storage medium according to claim 13, wherein the random action instruction sequence comprises at least two categories of action instructions selected from a group comprising a first category of action instructions, a second category of action instructions and a third category of action instructions; and wherein the program instructions are being executed to cause the computer or the processor to perform at least one step of:

for each first category of action instructions, determining whether a currently sent action instruction of the first category is executed by the living body according to an image captured by the image sensor;

for each second category of action instructions, determining whether a currently sent action instruction of the second category of is executed by the living body according to information detected by the at least one non-image sensor; and for each third category of action instructions, determining whether a currently sent action instruction of the third category is executed by the living body according to the image captured by the image sensor and the information detected by the non-image sensor.

15. The non-transitory computer readable storage medium according to claim 13, wherein the first detection information comprises at least one of facial gesture, facial key points, image texture information, image luminance, and an object recognized in the image captured by the image sensor, wherein the at least one non-image sensor comprises at least one of a light sensor, a distance sensor, an acceleration sensor and a gyroscope, and wherein the second detection information comprises at least one of light intensity, distance information, acceleration information, and gyroscope information.

* * * * *